May 18, 1948.     H. A. KOPP     2,441,887
ANTIGLARE VEHICLE ATTACHMENT
Filed May 9, 1946     2 Sheets-Sheet 1
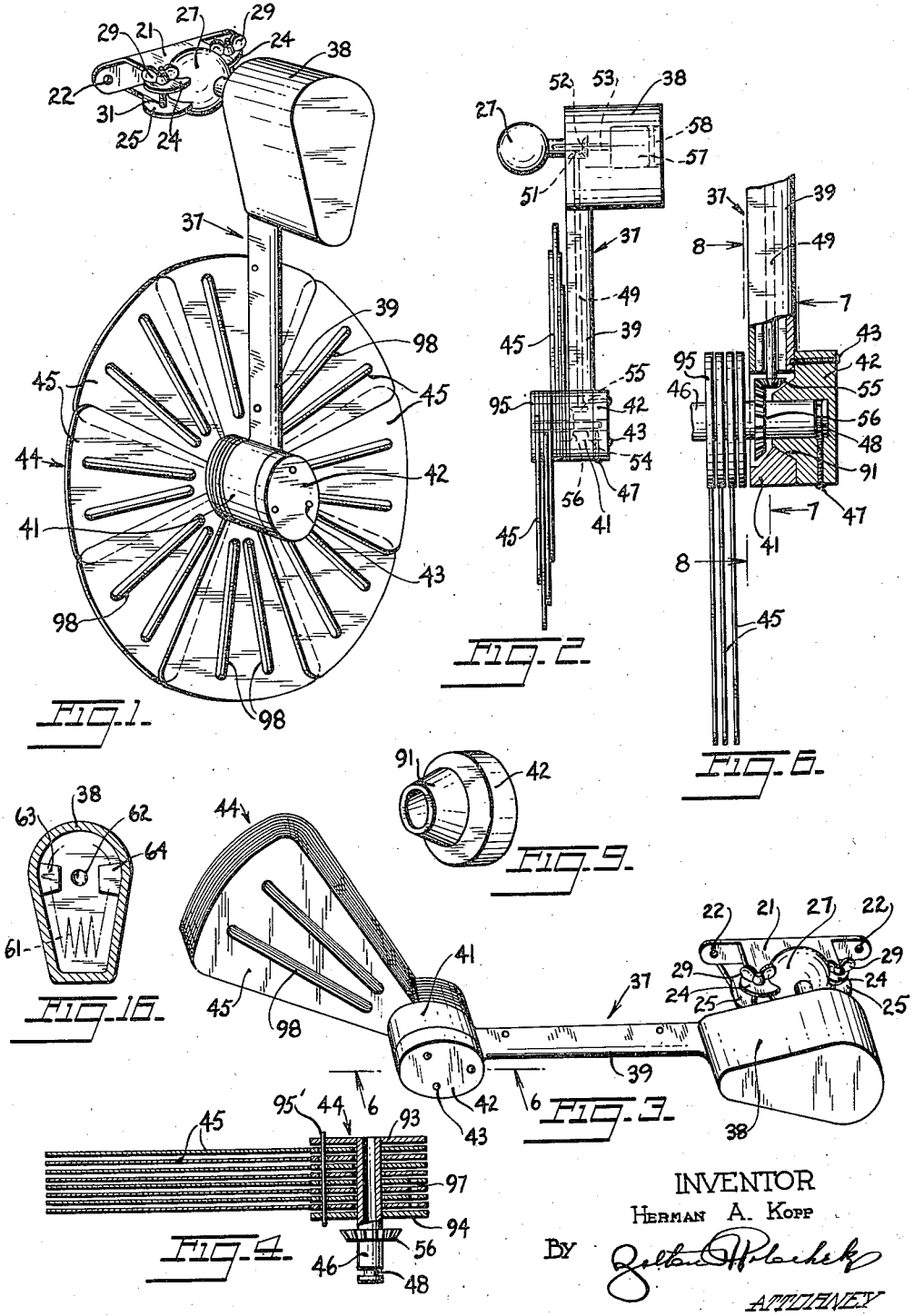
INVENTOR
HERMAN A. KOPP
BY
ATTORNEY May 18, 1948. H. A. KOPP 2,441,887
ANTIGLARE VEHICLE ATTACHMENT
Filed May 9, 1946 2 Sheets-Sheet 2
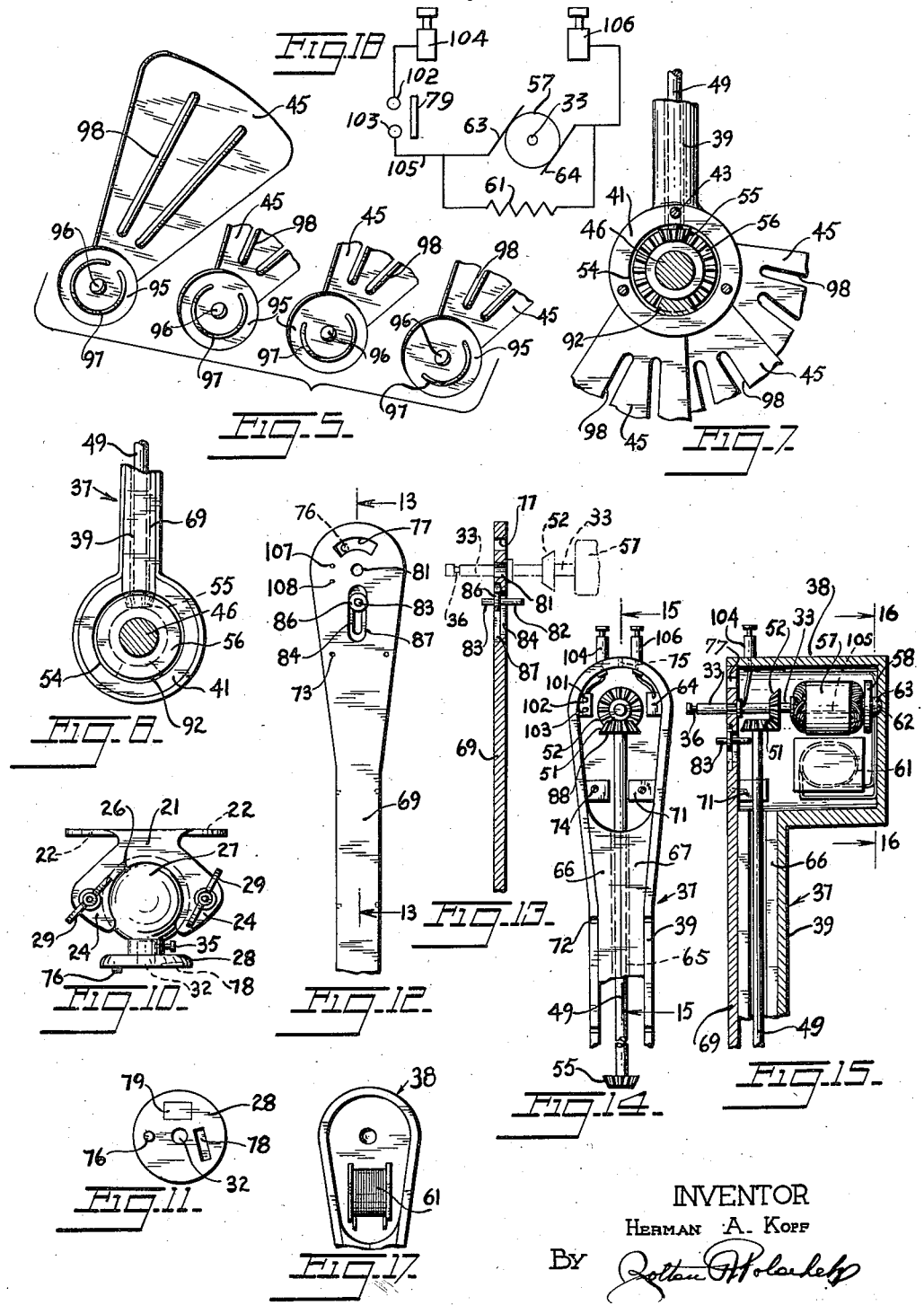
INVENTOR
HERMAN A. KOPF
BY
ATTORNEY Patented May 18, 1948

2,441,887

UNITED STATES PATENT OFFICE 2,441,887

ANTIGLARE VEHICLE ATTACHMENT

Herman A. Kopp, Bronx, N. Y.

Application May 9, 1946, Serial No. 668,523

8 Claims. (Cl. 296—97)

This invention relates to anti-glare devices for automobile windshields and particularly to a type which is swingable between the positions of use and non-use.

It is an object of the present invention to provide in an anti-glare device which is automatically put into and out of operation as it is swung or moved between its positions of non-use and use, an arm structure shaped to contain the motor removed from the blade axis so as not to interfere with the vision through the rotating blades.

It is another object of the invention to provide in an anti-glare shield which is automatically spread or enlarged as the device is moved to the position of use and is automatically collapsed or closed when the device is swung or returned to its non-use position, novel means for effecting a driving connection between the motor and the blades and braking means operable upon the driving connection to effect the collapse of the blades.

According to the invention, there is provided generally an adjustable support for mounting the device on the automobile, an arm pivoted on the support and operable between positions of use and non-use, an electrical motor carried by the arm adjacent its pivotable connection with the support and its shaft serving to effect the pivotal connection with the support, electrical contacts on the arm adapted to be automatically made as the arm is swung to a use position, and a collection of slotted blades drivingly connected with the motor and adapted to be axially aligned with one another when in the out of use position so as not to interfere with the operator's vision and adapted to be automatically fanned out as the motor is started by the movement of the arm from the non-use to the use position.

As the arm is moved to the non-use position the contacts are broken and a member is thrust into frictional engagement with one of the gears of gearing extending from the motor to the outer end of the arm for operating the blades whereby to effect a sudden stoppage of the driving gear so as to cause the blades connected to the driving gear to close under the impact. The individual blades are so connected with their driving shaft that when the shaft is stopped they will by their inertia be brought into axial alignment with one another. The drive connection between the electric motor and the fan blades preferably takes the form of bevel gears connected on opposite ends of the shaft which runs through the arm of the device and connected at opposite ends with the bevel gear of the motor armature shaft and at the opposite end with the bevel gear of the blades.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of the anti-glare device swung down to its in use position and with its blades fanned outwardly to form a complete circle.

Fig. 2 is a side elevational view of the device in its in use position and showing with dotted lines the driving mechanism therefor.

Fig. 3 is a perspective view of the device swung upwardly to the out of use position and with the blades closed and in radial registry with one another.

Fig. 4 is a cross sectional view of the collection of anti-glare blades with its bevel gear and shaft thereon.

Fig. 5 is a collected view of several blades separated from the series and partly broken away and showing their hubs with different length slots therein which determine the distance that the respective blades angle from the stop which retains them in the collected position.

Fig. 6 is a cross sectional view taken longitudinally of the arm and through the end or hub of the arm containing the blade collection, as along the line 6—6 of Fig. 3, looking in the direction of the arrows thereof.

Fig. 7 is a fragmentary plan view looking at the hub portion with the removable bearing element displaced therefrom whereby to show the gear connection with the collection of blades, the view being taken along the line 7—7 of Fig. 6, looking in the direction of the arrows thereof.

Fig. 8 is a fragmentary view of the hub end of the arm taken along the line 8—8 of Fig. 6, looking in the direction of the arrows thereof.

Fig. 9 is a perspective view of the bearing element adapted to fit in the hub portion to journal the shaft for operating the blades.

Fig. 10 is a top plan view of the bracket clamp which is screw fastened to the automobile along the upper edge of the windshield and serving to adjustably clamp the ball of a support on which the arm is angularly adjustable.

Fig. 11 is a plan view looking upon the face of the ball support with which the arm cooperates for angular adjustment.

Fig. 12 is a top plan view of the cover adapted to fit into the inner face of the arm structure.

Fig. 13 is a longitudinal sectional view of the cover plate taken along the line 13—13 of Fig. 12, looking in the direction of the arrows thereof, illustrating with dotted lines how the motor armature shaft is journalled in the cover.

Fig. 14 is a fragmentary plan view looking into the inner side of a portion of the arm structure adjacent the pivot after the cover plate has been removed.

Fig. 15 is a longitudinal sectional view taken along line 15—15 of Fig. 14, looking in the direction of the arrows thereof, showing the construction of the motor and its connection with the gearing, and a portion of the electrical wiring system.

Fig. 16 is a longitudinal sectional view looking upon the bottom of that portion of the arm structure showing the commutator brushes, the view being taken along the line 16—16 of Fig. 15.

Fig. 17 is an elevational view of the motor frame and winding removed from the arm structure.

Fig. 18 is a schematic wiring diagram of the device.

Referring now to Figs. 1, 2 and 3 wherein there is shown the general structure of the device, 21 is a clamping bracket adapted to be connected to the automobile at some point above the windshield and made fixed thereto by screws or the like adapted to pass through screw holes 22 in the base of the bracket. This bracket 21 has two pairs of forwardly extending socket jaws or portions 24 and 25 spaced from one another and recessed at 26 to receive a ball 27 of a ball support or member 28. The ball support 28 through the ball 27 is universally adjustable in the clamping bracket 21 and when located in its adjusted position, is fixed by bolts 31, which extend through the forwardly extending portions 24 and 25 toward one another and are engaged by wing nuts 29 to clamp the ball 27 in place between the socket jaws or portions 24 and 25.

The ball support 28 has a hole 32 therein (Fig. 10) for receiving a motor shaft 33 whereby to make the connection of the arm structure 37 with the ball support for pivotal movement with respect thereto. Once the shaft 33 is in place, a set screw 35 threaded into the ball support 28 cooperates with a groove 36 in the shaft end. This set screw acting in the groove will retain the arm structure against axial displacement while still permitting the pivotal movement thereof.

The arm structure is indicated generally at 37 and comprises a frame or motor housing 38, an arm or shaft housing 39 on the outer end of which is a round hub portion 41. The hub portion 41 carries a removable bearing 42 attached by screws 43 thereto and a fan blade structure 44 (Fig. 4) comprising anti-glare blades 45 and a shaft 46 adapted to be journalled in the bearing 42 and retained therein against axial displacement by means of a set screw 47 which enters a groove 48 on the outer end of the shaft 46.

The arm structure 37, including its arm or shaft housing 39 and frame or motor housing 38, is hollowed out to receive a drive shaft 49 having a bevel gear 51 thereon which meshes with a bevel gear 52 on an armature shaft 33 and at its outer end the shaft extends into a round opening 54 in the hub portion 41 wherein it contains a bevel gear 55 adapted to drive a bevel gear 56 on the shaft 46 of the anti-glare blade structure.

The armature shaft 33 carries an armature 57 and a commutator 58. The armature 57 rotates in the frame or motor housing 38 (Fig. 17) which has a field winding 61 therein. The armature shaft 33 is journalled in the end of the housing 38 as indicated at 62. At opposite sides of the journal opening 62 and fixed to the housing 38 are commutator brushes 63 and 64 with which the commutator 58 engages to effect the actuation of the motor.

The arm or shaft housing 39 provides a recess 65, (Fig. 14) in which the shaft 49 is journalled. Adjacent each side of the recess are shoulder portions 66 and 67 adapted to support a part of cover 69 (Figs. 12 and 13) of such shape as not only to fill the arm or shaft housing 39 of the arm structure 37 but also the inner end of the motor housing 38 wherein it is supported on a transverse portion 71 through which the shaft 49 extends and is journalled. The cover 69 is retained in place on the arm structure by the screws passed through openings 72 in the sides of the arm, holes 73 cooperating with holes 74 in the top of the transverse portion 71, and a hole 75 at the end of the motor housing 38.

Referring now to Fig. 11, there is shown the operating face of the ball support 28 wherein there is the hole 32 into which the shaft 33 is extended for coupling engagement with the ball support, an axially extending projection or pin 76 adapted to work in an arcuate slot 77 of the cover 69 whereby to limit the turning movement of the arm structure, a circumferentially and radially extending camming slot 78, and a bridging electric contacting plate 79, all of which are circumferentially spaced from one another about the hole 32. With the arm structure in place on the ball support with the shaft 33 having been extended through a hole 81 in the cover 69 and thence into the opening 32 of the ball support the projection or pin 76 will lie in the slot 77 and a sliding brake member 82 having a projection or pin 83 extending from the top of the cover and cooperating with the camming slot 78 in the ball support is adapted to be worked in a slot 84 extending longitudinally of the cover 69. To retain the brake member 82 against movement through the bottom of the cover, the member has a radially extending flange 86 working on a shoulder surface 87.

As the arm is swung upwardly or to an out of use position, the brake 82 is moved inwardly toward the shaft 33 and supplies braking action upon radially extending face 88 of the bevel gear 51 to suddenly stop the driving mechanism and the anti-glare blade structure. As the arm structure is returned to the in use position, the brake 82 is released from the surface 88.

The bearing support 42 (Fig. 9) has an inwardly extending tapered portion 91 to provide adequate journal surface for the support of the anti-glare blade structure. The tapered portion 91 will be supported on a shoulder 92 (Fig. 7) when in place on the hub and retained thereon by the screws 43, three of which are provided for the purpose.

Referring now to Figs. 4 and 5, detailed description will be made to the blade structure. The shaft 46 is hollow and has rigidly connected to it end plates 93 and 94 between which there extends a pin 95'. Each blade 45 has a hub portion 95 and an opening 96 to pivotally connect the same with the shaft 46. Surrounding the opening 96 is a concentric slot 97 through which the pin 95' extends. As shown more clearly in Fig. 5 the concentric slot for the different blades are of different length thereby giving each of the blades a different amount of fanning movement before they are stopped by the pin 95'. As the power is turned on, the pin 95' will pick up the different blades and cause them to be fanned out. As the brake 82 is applied to the gearing, the shaft 46 is stopped and the blades will continue to travel until they reach the pin to come into axial registry with one another as when the arm is raised or moved to the out of use position. The blades themselves are made of opaque material but have slots 98 through which only limited light can penetrate. This amount of light is so small that the glare or greater portion of light coming from the head lights of an oncoming automobile, is eliminated.

Referring now to Figs. 14, 15 and particularly Fig. 18, there is provided at the upper portion of the motor housing 38 a shelf portion 101 having contacts 102 and 103. The contact 102 is fed with current from a terminal 104 on the exterior of the housing 38. The other contact 103 is connected by a wire 105 to the brush 63, see Fig. 18. Another terminal 106 is connected directly to the brush 64. Across these brushes there is connected the shunt field winding 61 to supply the magnetic field for the armature 57. In the cover 69 there are two small holes 107 and 108 adapted to be aligned with contacts 102 and 103 respectively. Within these holes there are inserted contact springs adapted to be supported by the contacts 102 and 103 and extended therefrom. As the arm structure 37 is turned to an in use position the contacts through the springs within the openings 107 and 108 are bridged by the contact plate 79 on the ball support, thereby starting operation of the electric motor. As the arm is swung to the out of use position, not only is the brake 82 applied to the face of the bevel gear 88 but the bridging plate 79 is removed from the contacts to shut off the power from the motor.

It should now be apparent that there has been provided an anti-glare device for automobiles which is wholly automatic in operation and requires only that the arm be moved from the out of use position to the in use position to set the device in motion and to keep it running. The blades are automatically fanned out at this time and when the arm is brought back to the out of use position, the blades will automatically close so as not to at this time, interfere with the vision of the driver. The area consumed at this time is only that of one blade since the blades have become stacked one upon the other.

It will also be further apparent that by having the motor housing located adjacent the pivot point on the ball support rather than at the outer end of the arm structure adjacent the blades, the amount of vision through the blades is not impaired by the housing.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An anti-glare device comprising a support, an arm structure pivoted on said support for movement between positions of non-use and use, said arm structure including a motor housing adjacent its connection with the support and a hub portion radially removed from the housing, an electric motor in the housing, an anti-glare blade structure on the hub portion including a series of rotatively supported blades, means controlling angular movement of said blades relative to one another when moved to be evenly spaced into a circular formation from their positions of radial registry with one another, and means extending through the arm structure from the motor housing to the hub portion for establishing a driving connection between the motor and the collection of anti-glare blades.

2. An anti-glare device comprising a support, an arm structure pivoted on said support for movement between positions of non-use and use, said arm structure including a motor housing adjacent its connection with the support and a hub portion radially removed from the housing, an electric motor in the housing, an anti-glare blade structure on the hub portion including a series of rotatively supported blades, means controlling angular movement of said blades relative to one another when moved to be evenly spaced into a circular formation from their positions of radial registry with one another, means extending through the arm structure from the motor housing to the hub portion for establishing a driving connection between the motor and the collection of anti-glare blades, said driving connection between the motor and the anti-glare blades including a bevel gear on the electric motor, a shaft journalled in the arm structure and extending from the motor housing to a point within the hub portion, a bevel gear on a shaft within the housing drivingly connected with the motor bevel gear, a bevel gear on the shaft and within the hub, said blade structure including a shaft and a bevel gear on the shaft adapted to be driven by the bevel gear on the shaft extending from the motor housing.

3. An anti-glare device comprising a support, an arm structure pivoted on said support for movement between positions of non-use and use, said arm structure including a motor housing adjacent its connection with the support and a hub portion radially removed from the housing, an electric motor in the housing, an anti-glare blade structure on the hub portion including a series of rotatively supported blades, means controlling angular movement of said blades relative to one another when moved to be evenly spaced into a circular formation from their positions of radial registry with one another, means extending through the arm structure from the motor housing to the hub portion for establishing a driving connection between the motor and the collection of anti-glare blades, said blade structure including a shaft with a driving member thereon, said driving member disposed within the hub portion, a bearing member removably secured to the hub portion, said shaft of the blade structure journalled in the bearing member, and means for retaining the blade structure within the bearing member against axial displacement with respect thereto.

4. An anti-glare device comprising a support, an arm structure pivoted on said support for movement between positions of non-use and use, said arm structure including a motor housing adjacent its connection with the support and a hub portion radially removed from the housing, an electric motor in the housing, an anti-glare blade structure on the hub portion including a series of rotatively supported blades, means controlling angular movement of said blades relative to one another when moved to be evenly spaced into a circular formation from their positions of radial registry with one another, means extending through the arm structure from the motor housing to the hub portion for establishing a driving connection between the motor and the collection of anti-glare blades, and means applying a braking action to the driving connection means effect a sudden stoppage of the blades when the motor is deenergized.

5. An anti-glare device comprising a support, an arm structure pivoted on said support for movement between positions of non-use and use, said arm structure including a motor housing adjacent its connection with the support and a hub portion radially removed from the housing, an electric motor in the housing, an anti-glare blade structure on the hub portion including a series of rotatively supported blades, means controlling angular movement of said blades relative to one another when moved to be evenly spaced into a circular formation from their positions of radial registry with one another, means extending through the arm structure from the motor housing to the hub portion for establishing a driving connection between the motor and the collection of anti-glare blades, said driving connection including gearing with one of its gears disposed in the motor housing and provided with a braking surface, and means extending between the pivot support for the arm structure and the motor housing operable as the arm is swung to a non-use position to apply a braking action upon the braking surface of the gear and adapted to be released as the arm structure is moved to a position of use.

6. An anti-glare device comprising a support, an arm structure pivoted on said support for movement between positions of non-use and use, said arm structure including a motor housing adjacent its connection with the support and a hub portion radially removed from the housing, an electric motor in the housing, an anti-glare blade structure on the hub portion including a series of rotatively supported blades, means controlling angular movement of said blades relative to one another when moved to be evenly spaced into a circular formation from their positions of radial registry with one another, means extending through the arm structure from the motor housing to the hub portion for establishing a driving connection between the motor and the collection of anti-glare blades, said driving means including a bevel gear extending at right angles to the motor shaft, said arm structure and housing being open on its inner face, a cover extending over said opening, a longitudinally slidable member carried by the cover and slidable into and out of engagement with said gear on the driving means whereby when in engagement to apply a braking action upon the driving means and effect a sudden stoppage of the blades as the arm structure is swung to a position of non-use, said braking member projecting from the cover adjacent the pivotal connection of the arm structure with said pivot support, and said pivot support having a camming slot adapted to receive the projection of the braking member to effect its operation as the arm structure is pivoted upon the support.

7. An anti-glare device comprising a support, an arm structure pivoted on said support for movement between positions of non-use and use, said arm structure including a motor housing adjacent its connection with the support and a hub portion radially removed from the housing, an electric motor in the housing, an anti-glare blade structure on the hub portion including a series of rotatively supported blades, means controlling angular movement of said blades relative to one another when moved to be evenly spaced into a circular formation from their positions of radial registry with one another, means extending through the arm structure from the motor housing to the hub portion for establishing a driving connection between the motor and the collection of anti-glare blades, comprising an armature shaft extending inwardly from the arm structure and adapted to serve as a means for connecting the arm structure with the pivot support, said pivot support having a central opening for receiving the armature shaft, and means for securing the armature shaft within the support opening against axial displacement therefrom while permitting rotation of the shaft and pivotal movement of the arm structure.

8. An anti-glare device, comprising a support fixedly mounted in position, an arm pivotally mounted on said support for movement between positions of use and non-use, a series of glare eliminating blades rotatively mounted on said arm and normally in stacked inoperative position, means controlling the angular displacement of said blades relative to one another to form a complete circle when opened, and means controlled by movement of said arm from a position of non-use to a position of use for opening the blades into said circular formation.

HERMAN A. KOPP.

REFERENCES CITED

The following references are of record in the file of this patent:

UNITED STATES PATENTS

| Number | Name | Date |
| --- | --- | --- |
| 1,408,386 | Newton | Feb. 28, 1922 |
| 1,781,777 | Conner | Nov. 18, 1930 |